United States Patent
Gibson et al.

(10) Patent No.: US 10,533,312 B2
(45) Date of Patent: Jan. 14, 2020

(54) PARTIAL BLOCKAGE DETECTION USING BACKWATER VALVE

(71) Applicants: Michael Gibson, Hamilton (CA); Larry Boyle, Hamilton (CA); Raymond MacDonald, Hamilton (CA); Joseph MacIssac, Brantford (CA); Michael Szkudlarek, Toronto (CA)

(72) Inventors: Michael Gibson, Hamilton (CA); Larry Boyle, Hamilton (CA); Raymond MacDonald, Hamilton (CA); Joseph MacIssac, Brantford (CA); Michael Szkudlarek, Toronto (CA)

( * ) Notice: Subject to any disclaimer, the term of this patent is extended or adjusted under 35 U.S.C. 154(b) by 24 days.

(21) Appl. No.: 15/720,925

(22) Filed: Sep. 29, 2017

(65) Prior Publication Data

US 2018/0094416 A1    Apr. 5, 2018

Related U.S. Application Data

(60) Provisional application No. 62/402,051, filed on Sep. 30, 2016.

(30) Foreign Application Priority Data

May 5, 2017 (CA) .................................... 2966453

(51) Int. Cl.
*E03F 7/00* (2006.01)
*G08B 21/18* (2006.01)
(Continued)

(52) U.S. Cl.
CPC .............. *E03F 7/00* (2013.01); *G08B 21/182* (2013.01); *H04Q 9/00* (2013.01); *E03F 7/04* (2013.01);
(Continued)

(58) Field of Classification Search
CPC .... G08B 21/182; H04Q 9/00; H04Q 2209/40; H04Q 2209/823; E03F 7/00; E03F 7/004; E03F 2201/40
See application file for complete search history.

(56) References Cited

U.S. PATENT DOCUMENTS

| 5,113,901 A | 5/1992 | Young |
| 5,406,972 A | 4/1995 | Coscarella et al. |

(Continued)

FOREIGN PATENT DOCUMENTS

| CA | 2825895 A1 | 3/2015 |

*Primary Examiner* — P. Macade Nichols
(74) *Attorney, Agent, or Firm* — Norris McLaughlin, P.A.

(57) ABSTRACT

The present disclosure describes systems and apparatus for detecting an impending sewer backup by detecting fluid undulations of predetermined magnitude inside a main body of a backwater valve. When at least a predetermined number of fluid undulations of predetermined magnitude are detected within a predetermined time period, an alarm can be triggered. Such undulations can be detected by monitoring a buoyant gate in a normally-open backwater valve to detecting instances of movement of the gate from a lowered position in which fluid flow from an inlet through the backwater valve is unobstructed by the gate toward but stopping short of a raised position in which the gate closes the inlet to obstruct fluid flow through the valve. For example, a sensor can be carried on the gate to detect movement of the gate. Alternatively, fluid levels inside the main body can be monitored directly.

18 Claims, 12 Drawing Sheets

(51) Int. Cl.
*H04Q 9/00* (2006.01)
*E03F 7/04* (2006.01)

(52) U.S. Cl.
CPC ...... *E03F 2201/40* (2013.01); *H04Q 2209/40* (2013.01); *H04Q 2209/823* (2013.01)

(56) References Cited

U.S. PATENT DOCUMENTS

2007/0103324 A1* 5/2007 Kosuge .................... E03F 7/00
                                                    340/618
2009/0314351 A1* 12/2009 McDonald ............. E03B 7/071
                                                    137/2

* cited by examiner

PARTIAL BLOCKAGE DETECTION USING BACKWATER VALVE

CROSS-REFERENCE TO RELATED APPLICATIONS

The present application claims priority to U.S. Provisional Application No. 62/402,051 filed on Sep. 30, 2016 and to Canadian Patent Application No. 2,966,453 filed on May 5, 2017, the teachings of each of which are hereby incorporated by reference.

TECHNICAL FIELD

The present disclosure relates to backwater valves, and more particularly to detection of partial blockages using a backwater valve.

BACKGROUND

Sewer backups, where the main sewer line overflows and forces raw sewage back into a building sewer line such as that of a home, can be a significant problem. Such backups can lead to basement flooding or worse.

To guard against such backups, it is now common to interpose a backwater valve between a building sewer line and the main sewer line. Various designs have been proposed over the years, and in 1995 Gabe Coscarella and Vitto Chiodo were granted U.S. Pat. No. 5,406,972 (the teachings of which are hereby incorporated by reference) for a normally open backwater valve. The Coscarella and Chiodo valve includes a buoyant, pivoting gate disposed in the body of the valve. When sewage is flowing normally, the gate will be in a lowered position in which water can flow from the home or other building past the gate through the body of the valve toward the sewer. However, in the event of a sewer backup, the inflow of sewage causes the buoyant gate to pivot upwardly into sealing engagement with the valve inlet to prevent the sewage from entering the inlet and infiltrating the home.

It has also been proposed to incorporate sensors into a backwater valve to detect and trigger an alarm in the event of a sewer backup (see, for example, Canadian Patent Application No. 2,825,895 and U.S. Pat. No. 5,113,901).

It would be desirable, however, to detect conditions that are likely to lead to a sewer backup before such a backup actually occurs, so that corrective measures can be taken. For example, in areas where clay pipes are used in the sewer system, infiltration by tree roots can, over time, occlude a sewer pipe, and it would be desirable to detect and remedy such infiltration before the pipe is completely occluded and a sewer backup results.

SUMMARY

When a sewer line is partially but not completely obstructed, after fluid flows through the backwater valve into the sewer there will typically be some backwash back into the body of the backwater valve, resulting in a repeatedly undulating volume of fluid in the body of the backwater valve. Thus, fluid undulation in the body of the backwater valve can serve as a proxy for a partial sewage blockage, such that a method of detecting an impending sewer backup may comprise detecting fluid undulations of predetermined magnitude inside the main body of a backwater valve, and responsive to detecting at least a predetermined number of such fluid undulations within a predetermined time period, triggering an alarm.

In one aspect, a backwater valve comprises a main body defining an interior volume, an inlet in fluid communication with the interior volume of the main body and an outlet in fluid communication with the interior volume of the main body. A gate is disposed inside the main body and is pivotally carried by the main body so as to be movable between a lowered position in which fluid flow through the inlet into the interior volume of the main body is unobstructed by the gate and a raised position in which the gate closes the inlet to obstruct fluid flow through the inlet. When the gate is in the lowered position, fluid can flow from the inlet into and through the interior volume of the main body to and out of the outlet. The gate is buoyant in water, whereby backflow through the outlet into the interior volume of the main body pivots the gate toward the raised position. The backwater valve includes a sensor for sensing movement of the gate toward but stopping short of the raised position.

Preferably, the sensor is coupled to a detector configured to trigger an alarm upon detecting a predetermined number of sensor activations within a predetermined period.

In some embodiments, the sensor comprises a tilt switch carried by the gate so that the tilt switch is open when the gate is in the lowered position and closes as the gate moves toward the raised position. In such embodiments, the sensor may further comprise a wireless transmitter and a battery, with the tilt switch electrically interposed between the wireless transmitter and the battery so that, when the tilt switch is closed, the wireless transmitter transmits a signal and when the tilt switch is open, the wireless transmitter is silent. The sensor may be coupled to the detector by way of wireless communication from the wireless transmitter. The tilt switch, the wireless transmitter and the battery may be encased in a watertight enclosure. The detector may be physically remote from the backwater valve.

In another aspect, a method for detecting an impending sewer backup comprises monitoring a buoyant gate in a normally-open backwater valve. Such monitoring is to detect instances of movement of the gate from a lowered position in which fluid flow from an inlet through the backwater valve is unobstructed by the gate toward but stopping short of a raised position in which the gate closes the inlet to obstruct fluid flow through the valve. Responsive to detecting at least a predetermined number of instances of movement of the gate within a predetermined time period, an alarm is triggered.

In yet another aspect, a method for detecting an impending sewer backup comprises detecting fluid undulations of predetermined magnitude inside a main body of a backwater valve, and responsive to detecting at least a predetermined number of fluid undulations of predetermined magnitude within a predetermined time period, triggering an alarm.

In still a further aspect, a backwater valve comprises a main body defining an interior volume, an inlet in fluid communication with the interior volume of the main body and an outlet in fluid communication with the interior volume of the main body. A gate is disposed inside the main body and is pivotally carried by the main body so as to be movable between a lowered position in which fluid flow through the inlet into the interior volume of the main body is unobstructed by the gate and a raised position in which the gate closes the inlet to obstruct fluid flow through the inlet. When the gate is in the lowered position, fluid can flow from the inlet into and through the interior volume of the main body to and out of the outlet. The gate is buoyant in water, whereby backflow through the outlet into the interior volume of the main body pivots the gate toward the raised position. The backwater valve includes a sensor for sensing fluid undulations of predetermined magnitude inside the main body of the backwater valve, and the sensor is coupled to a detector configured to trigger an alarm upon detecting a predetermined number of sensor activations within a predetermined period.

In some embodiments, the sensor comprises a switch. In particular embodiments, the switch comprises a pair of spaced-apart probes depending into the interior volume, and at least the tips of the probes are conductive, whereby the fluid undulations of predetermined magnitude inside the main body of the backwater valve immerse the tips of the probes and thereby close the switch. The sensor may further comprise a wireless transmitter and a battery, with the switch electrically interposed between the wireless transmitter and the battery so that, when the switch is closed, the wireless transmitter transmits a signal and when the switch is open, the wireless transmitter is silent. The sensor may be coupled to the detector by way of wireless communication from the wireless transmitter, and the detector may be physically remote from the backwater valve.

In yet another aspect, an alarm system for a backwater valve comprises a sensor for sensing fluid undulations of predetermined magnitude inside a main body of the backwater valve and a detector operable to communicate with the sensor, with the detector configured to trigger an alarm upon detecting a predetermined number of sensor activations within a predetermined period.

In certain embodiments, the sensor comprises a switch, and in particular embodiments the switch comprises a pair of spaced-apart probes extending from the inside of a removable closure member receivable in the cleaning hatch in the removable top of the main body of the backwater valve. At least the tips of the probes are conductive, whereby the fluid undulations of predetermined magnitude inside the main body of the backwater valve immerse the tips of the probes and thereby close the switch.

Where the sensor is a switch, the sensor may further comprise a wireless transmitter and a battery, and the switch may be electrically interposed between the wireless transmitter and the battery so that, when the switch is closed, the wireless transmitter transmits a signal and when the switch is open, the wireless transmitter is silent.

The detector may be operable to communicate with the sensor way of wireless communication from the wireless transmitter.

BRIEF DESCRIPTION OF THE DRAWINGS

These and other features will become more apparent from the following description in which reference is made to the appended drawings wherein.

DETAILED DESCRIPTION

Figure 1A:
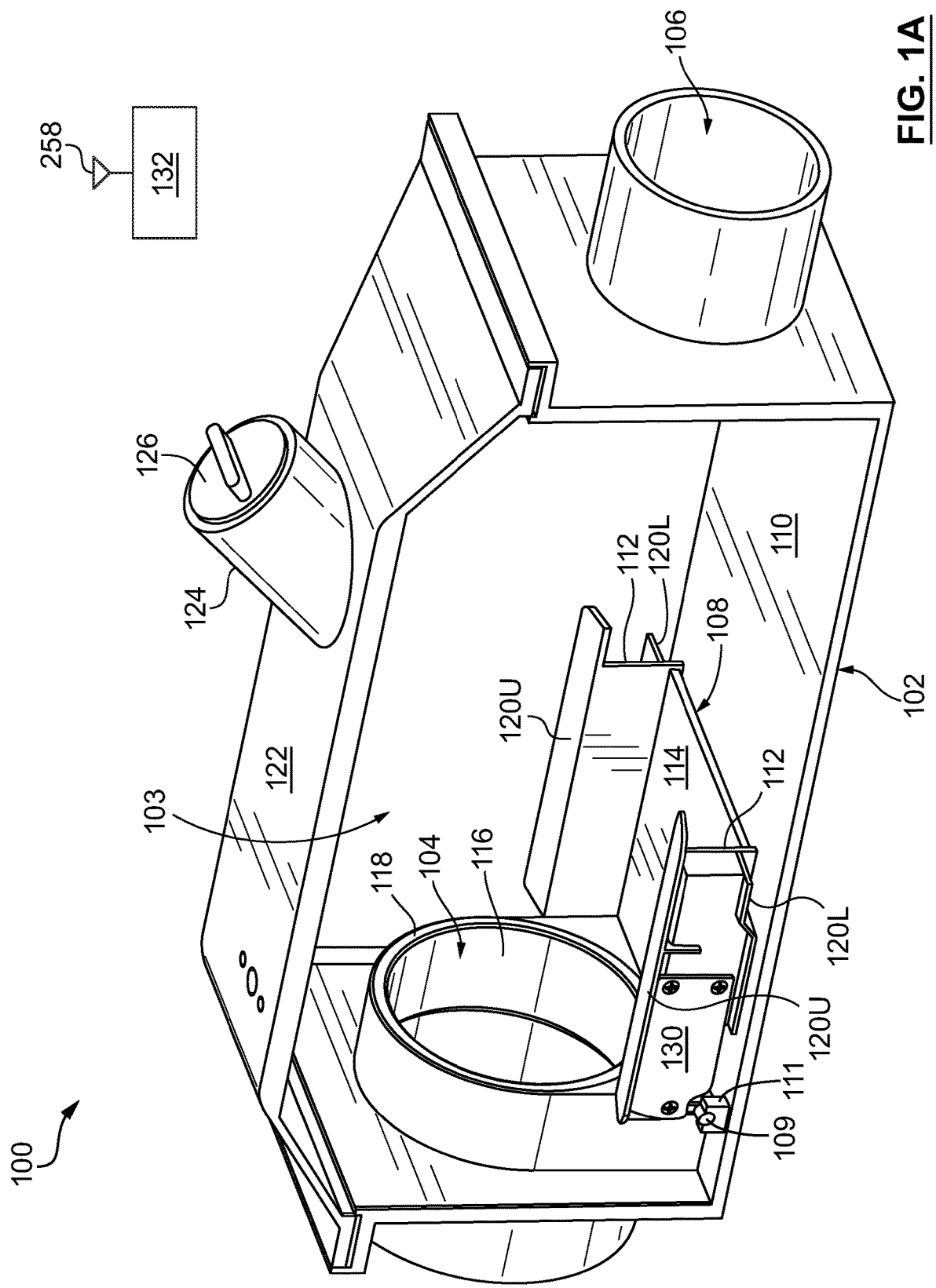
FIG. 1A is a top isometric cut-away view showing a first exemplary backwater valve according to an aspect of the present disclosure, with a gate thereof in a lowered position and a sensor mounted to the gate.
Figure 1B:
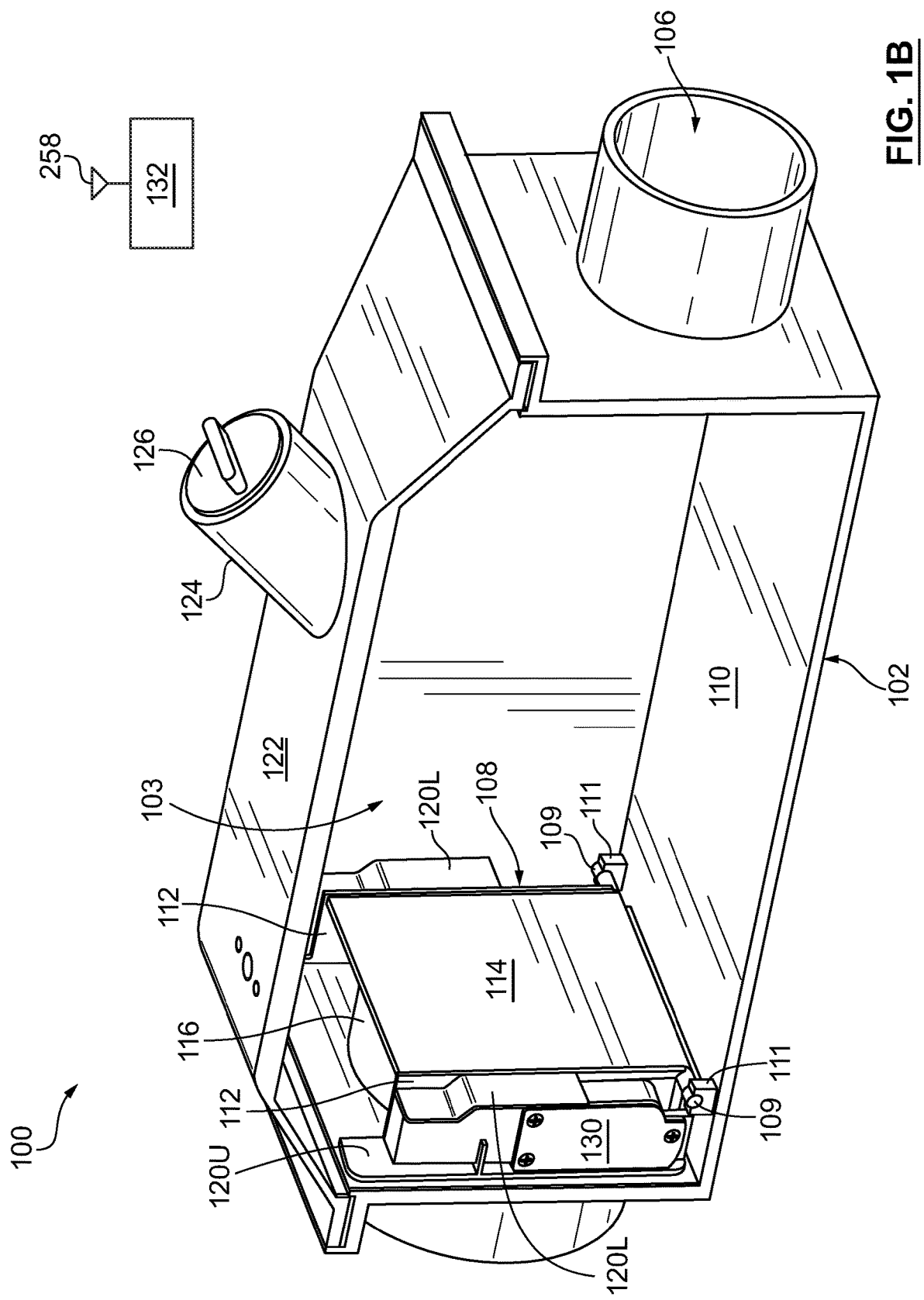
FIG. 1B is a top isometric cut-away view of the backwater valve of FIG. 1A, showing the gate thereof in a raised position.

Reference is now made to FIGS. 1A and 1B, which show a first exemplary normally-open backwater valve 100. The backwater valve 100 comprises a main body 102 defining an interior volume 103, an inlet 104 in fluid communication with the interior volume 103 of the main body 102, and an outlet 106 in fluid communication with the interior volume 103 of the main body 102. A gate 108 is disposed inside the main body 102 and is pivotally carried by the main body 102. The gate 108 is pivotably movable between a lowered position, shown in FIG. 1A, and a raised position, shown in FIG. 1B. In the illustrated embodiment, the gate 108 includes outwardly extending pivot shafts 109 which are received in corresponding pivot cradles 111 extending from the lower interior surface 110 of the main body 102 so as to enable the gate 108 to pivot between the raised and lowered positions; other pivot arrangements may also be used. In the lowered position, fluid flow through the inlet 104 into the interior volume 103 of the main body 102 is unobstructed by the gate 108, so that fluid can flow from the inlet 104 into and through the interior volume 103 of the main body 102 to and out of the outlet 106. In the raised position, the gate 108 closes the inlet 104 to obstruct fluid flow through the inlet 104. The gate 108 is buoyant in water.

Preferably, the inlet 104 is disposed above the outlet 106 to facilitate fluid flow from the inlet 104 toward the outlet 106. Also preferably, when in the lowered position the generally planar main closure portion 114 of the gate 108 is spaced from the lower interior surface 110 of the main body 102 to keep the gate 108 from being adhered to the lower interior surface 110 by accumulated detritus. In the illustrated embodiment, the inlet 104 protrudes inwardly into the interior volume 103 of the main body 102 and the gate 108 includes sidewalls 112 that extend beyond the main closure portion 114 of the gate 108 to engage the lower interior surface 110 when the gate 108 is in the lowered position so as to keep the main closure portion 114 of the gate 108 spaced from the lower interior surface 110 when the gate 108 is in the lowered position. The protruding portion 116 of the inlet 104 may be provided with an annular seal 118 that engages the main closure portion 114 of the gate 108 when the gate 108 is in the raised position. The sidewalls 112 of the gate 108 may be provided with outwardly-extending upper and lower sidewall flaps 120U and 120L, respectively, and the main body 102 may be provided with a removable top 122, which may in turn include a cleaning hatch 124 with a removable closure member 126.

During normal operation, sewage spills out of the inlet 104 into the interior volume 103 of the main body 102 onto the gate 108 and flows through the interior volume 103 of the main body 102 to the outlet 106. The gate 108 is maintained in the lowered position by gravity (i.e. the backwater valve 100 is "normally open"). In the event of a sewer backup, because the gate 108 is buoyant in water, sewage flowing through the outlet 106 into the interior volume 103 of the main body 102 will cause the gate 108 to float which, since the gate 108 is constrained to pivot, will move the gate 108 from the lowered position toward the raised position. Thus, backflow through the outlet 106 into the interior volume 103 of the main body 102 pivots the gate 108 toward the raised position. When the level of sewage in the interior volume 103 of the main body is sufficiently high, as in the case of a complete backup, the gate 108 will be moved completely into the raised position, closing the inlet 104 and inhibiting sewage from proceeding through the inlet 104.

The backwater valve is adapted to enable detection of fluid undulations of predetermined magnitude inside the interior volume 103 of the main body 102 of the backwater valve 100, to thereby enable detection of an impending sewer backup. More particularly, where a sewer line is only partially obstructed, after fluid flows through the outlet 106 there is a backwash which leads to an undulating volume of fluid in the interior volume 103 of the main body 102 of the backwater valve 100. The number and magnitude of the undulations will generally correspond to the extent of the obstruction—the greater the degree of blockage, the greater the magnitude of the undulations and the more frequent they will be. Therefore, a partial obstruction, i.e. an impending sewer backup, can be detected by monitoring fluid undulations in the interior volume 103 of the main body 102 of the backwater valve 100.

Figure 1C:
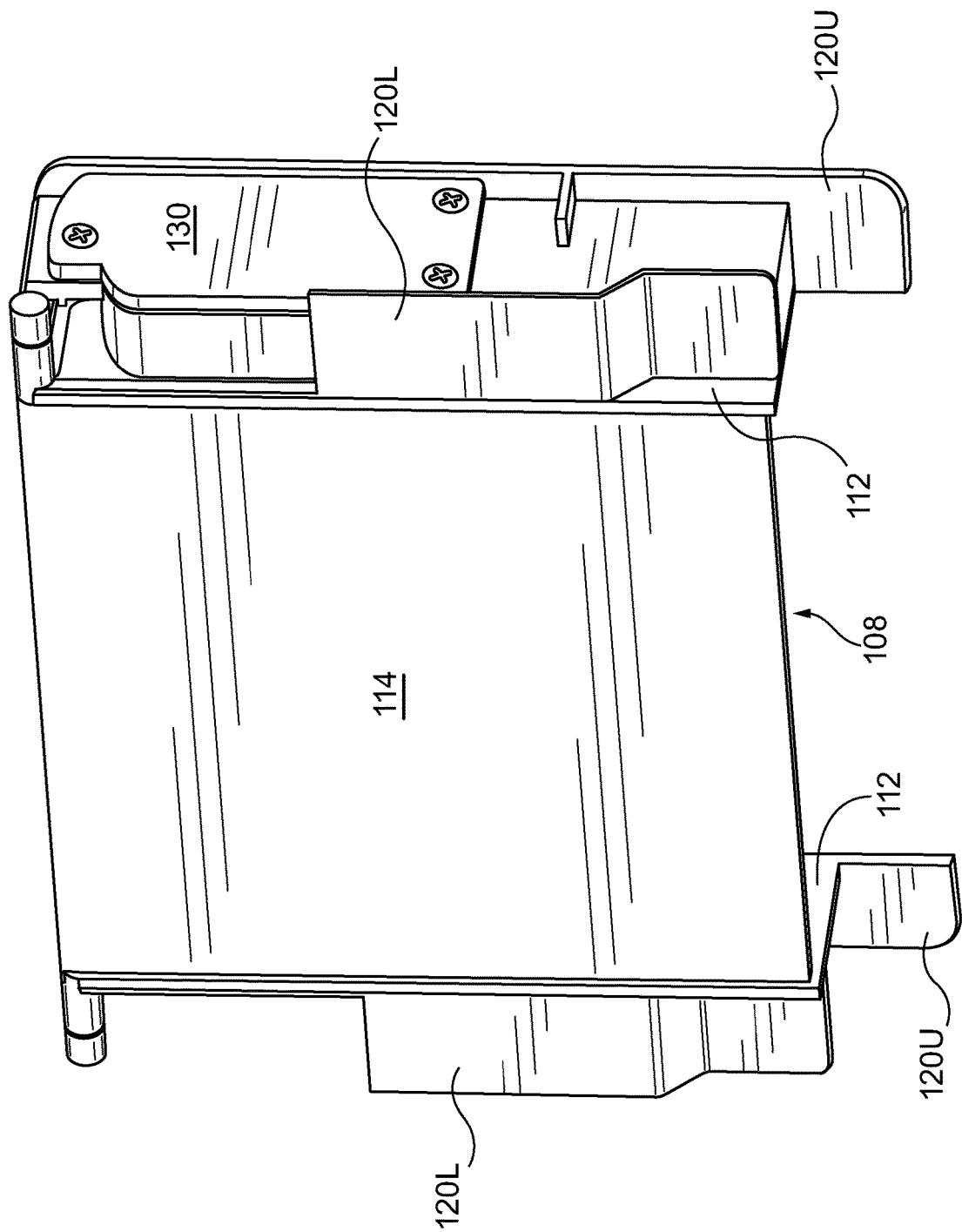
FIG. 1C is a bottom isometric view of the gate of the backwater valve of FIG. 1A, showing mounting of a sensor thereon.

In the exemplary illustrative embodiment shown in FIGS. 1A and 1B, the backwater valve 100 is adapted to enable detection of fluid undulations by way of a sensor 130 adapted to sense movement of the gate 108 toward the raised position. In the illustrated embodiment, as best seen in FIG. 1C, the sensor 130 is mounted to and hence carried by the gate 108; in particular, the sensor 130 is secured against one of the sidewalls of the gate 108, between the upper and lower sidewall flaps 120U and 120L.

Importantly, the sensor 130 is adapted to sense movement of the gate 108 from the lowered position toward the raised position but which stops short of reaching the raised position. If the gate 108 has moved fully to the raised position, this means that a sewer backup has already occurred. In contrast, in the case of a partial obstruction, the undulating fluid in the interior volume 103 of the main body 102 will cause the buoyant gate 108 to reciprocate toward and away from the raised position but without actually reaching the raised position. The sensor 130 can be configured to detect when the gate 108 has pivoted to a predetermined position corresponding to a predetermined magnitude of undulation (i.e. a predetermined height reached by the undulating sewage in the main body 102 of the backwater valve 100), and may be coupled to a detector 132 configured to trigger an alarm upon detecting a predetermined number of sensor activations within a predetermined period. Thus, when sewage in the interior volume 103 of the main body 102 undulates to a predetermined height with a predetermined frequency, the detector 132 will trigger an alarm. Thus, it is to be appreciated that the predetermined number of sensor activations is a plurality of sensor activations and not merely a single sensor activation. The detector 132 may comprise, for example, a suitably programmed Arduino board, a programmable logic controller (PLC) or any other suitable device, including a suitably programmed general purpose computer or special purpose hardware, and may communicate with additional devices to trigger an alarm. For example, where the detector is an Arduino board, it may trigger an audible alarm and/or communicate with another device to, for example, transmit an electronic message (e.g. an e-mail, SMS message or the like) to a homeowner. Optionally, depending on the type of sensor used, the detector may also be configured to detect when the gate 108 has moved fully into the closed position.

Reference is now made to FIGS. 2A to 2D, which show various views of the exemplary sensor 130. In the illustrated embodiment, the sensor 130 is a tilt sensor and includes a watertight enclosure 234, with the electrical components of the sensor 130 being encased within the watertight enclosure 234, which is mounted to the gate 108. In other embodiments, the components may be sealed individually. The watertight enclosure 234 comprises an enclosure body 236, an enclosure door 238, and a gasket 240 for creating a watertight seal between the enclosure body 236 and the enclosure door 238. The enclosure body 236 defines a cavity 242 for receiving the electrical components of the sensor 130, and the enclosure door 238 is secured to the enclosure body 236 by nuts 244 and bolts 246 (although other fastening techniques may also be used). Although in the illustrated embodiment the enclosure 234 is a separate component, it is also contemplated that a watertight enclosure for the sensor components could be integrally formed in the gate. It is contemplated that systems according to the present disclosure may be retrofit into existing backwater valves, for example by mounting a sensor on an existing gate in a backwater valve, or by replacing an existing gate in a backwater valve with a new gate that carries a sensor.

In the illustrated embodiment, the sensor 130 comprises a tilt switch 248, a wireless transmitter 250 and a battery 252 all carried on a circuit board 254. The tilt switch 248 may be, for example, of ball-in-tube construction, and is electrically interposed between the wireless transmitter 250 and the battery 252 by way of leads 256 so that, when the tilt switch 248 is closed, the wireless transmitter 250 transmits a signal and when the tilt switch 248 is open, the wireless transmitter 250 is silent. Thus, in this embodiment, the sensor 130 is coupled to the detector 132 by way of wireless communication from the wireless transmitter 250, with the detector 132 being provided with a wireless receiver 258 (FIGS. 1A and 1B) adapted to receive signals from the wireless transmitter 250. This enables the detector 132 to be located physically remote from the backwater valve 100, such as in another room, without the need to run wiring from the sensor 130 to the detector 132 (although a wired connection is also contemplated).

Since the tilt switch 248 is fixed inside the enclosure 234, which is mounted to the gate 108, the tilt switch 248 is carried by the gate 108. The tilt switch 248 is positioned within the enclosure 234 so that when the enclosure 234 is mounted to the gate 108, the tilt switch 248 will be positioned relative to the gate 108 such that the tilt switch 248 is open when the gate 108 is in the lowered position and closes as the gate 108 moves toward the raised position. The tilt switch 248 can be positioned so that it will close when the gate 108 reaches a predetermined angular position corresponding to a predetermined magnitude of undulation, as desired.

Thus, a relatively short signal from the wireless transmitter 250 will result when the tilt switch 248 closes as the gate 108 moves toward the raised position and then opens as the gate 108 moves back toward the lowered position. As such, a relatively short signal from the wireless transmitter 250 represents an undulation of sewage in the backwater valve 100 and enables detection of that undulation by the detector 132. The detector 132 can also be configured to detect that the gate 108 remains in the closed position (i.e. a complete obstruction) as represented by a continuous signal from the wireless transmitter 250 exceeding a predetermined duration, i.e. longer than would be expected from a closure of the tilt switch 248 resulting from an undulation. Additionally, the detector 132 may be configured to monitor battery consumption for the battery 252. For example, the detector 132 may be programmed with a (preferably conservative) estimate of the total duration of time that the battery 252 can power the wireless transmitter 250 and to compare the cumulative duration of wireless signals received to the estimate of the total duration and provide an alert as the battery 252 approaches its expected end of life.

Figure 2A:
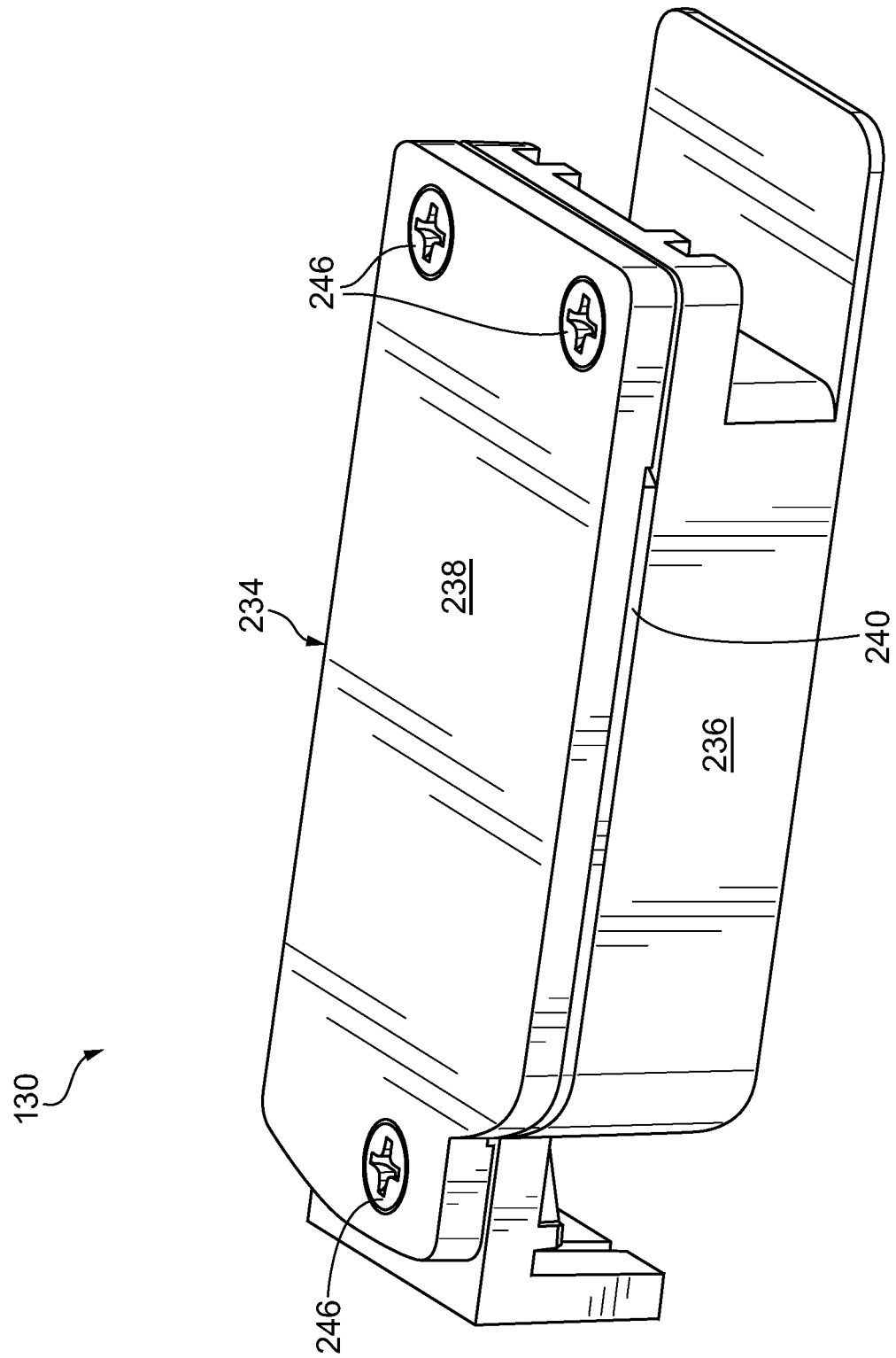
FIG. 2A is a top isometric view of the sensor of FIG. 1A.
Figure 2B:
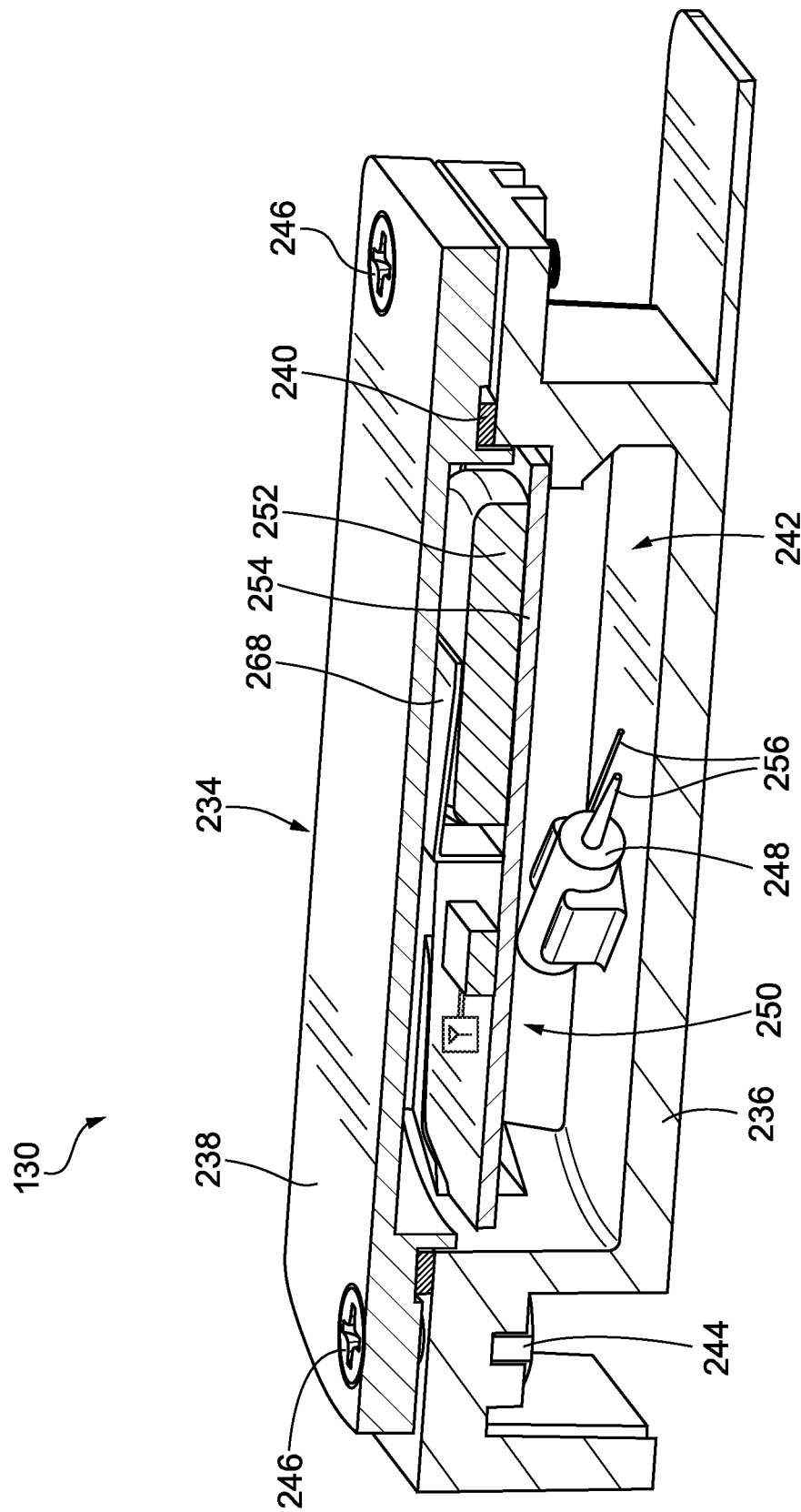
FIG. 2B is a top isometric cut-away view of the sensor of FIG. 1A.
Figure 2C:
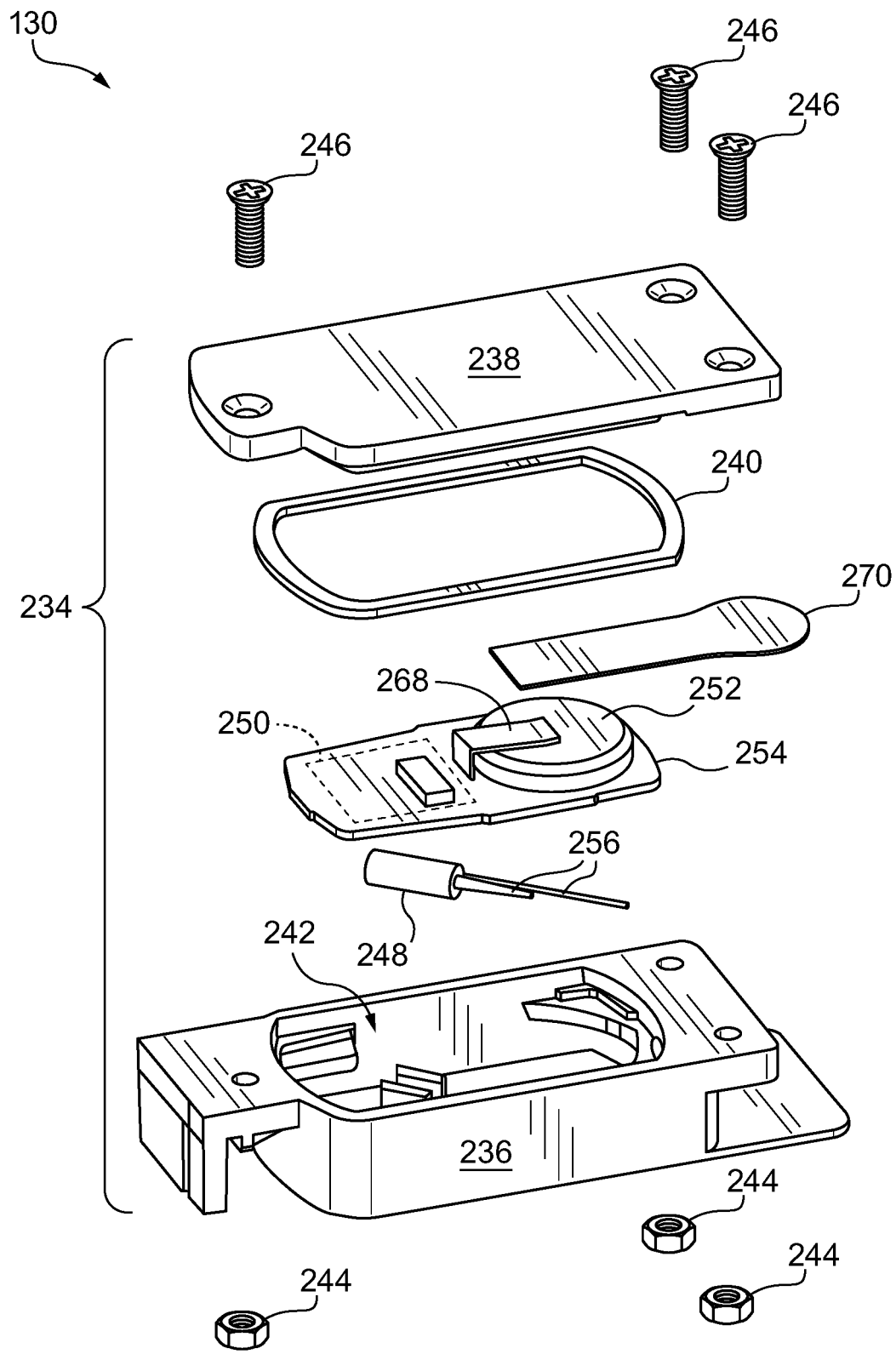
FIG. 2C is an exploded top isometric view of the sensor of FIG. 1A.
Figure 2D:
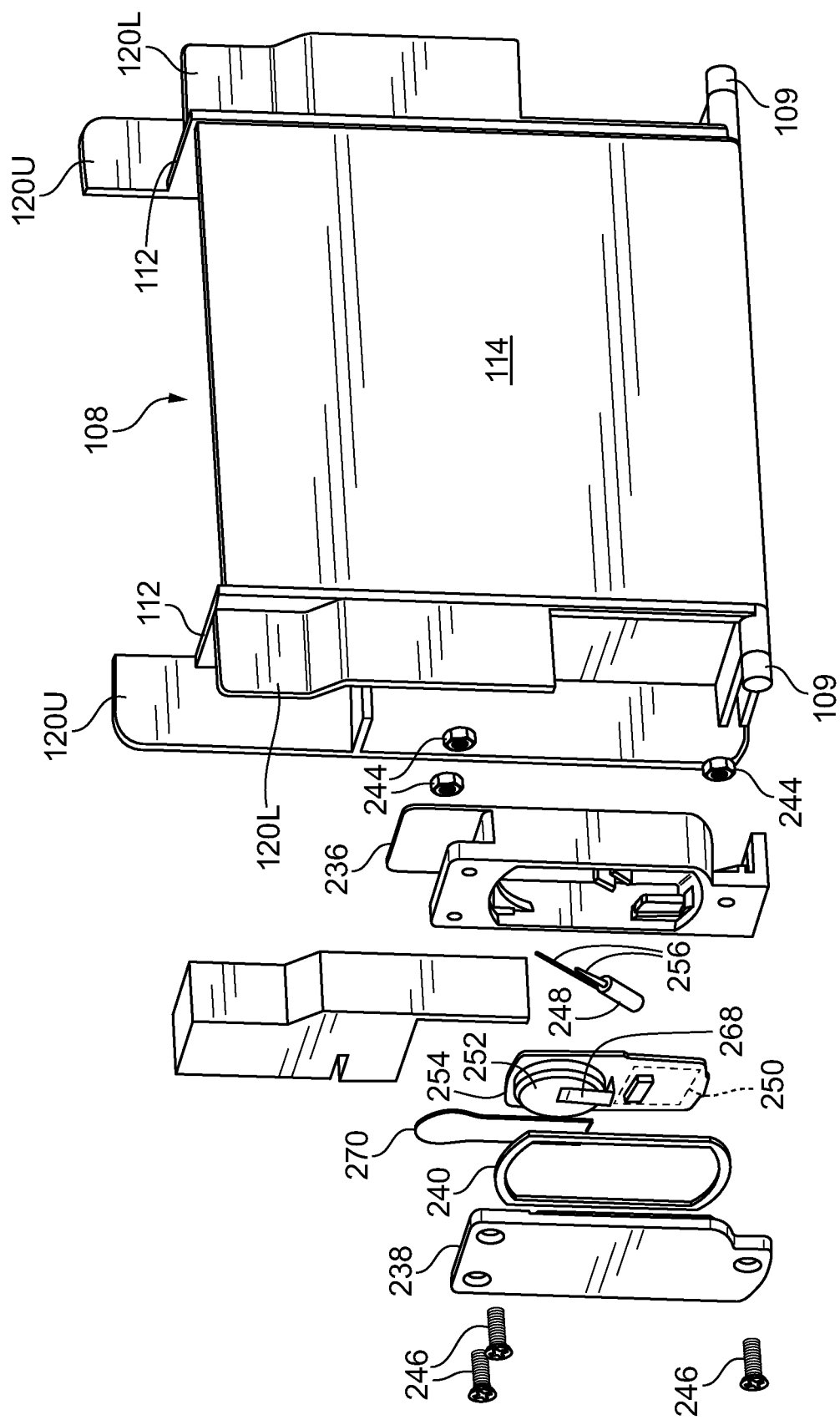
FIG. 2D is an exploded top isometric view of the gate and sensor of FIG. 1A.

Referring now to FIGS. 2C and 2D, a thin strip 270 of insulating plastic may be installed between the battery 252 and the battery contact 268 during assembly of the sensor 130 to maintain an open circuit so as to prevent the battery from draining during shipping (since the tilt switch 248 may close during shipping). The strip 270 can then be pulled out prior to insulation to allow the battery contact 268 to electrically engage the battery 252.

Figure 2E:
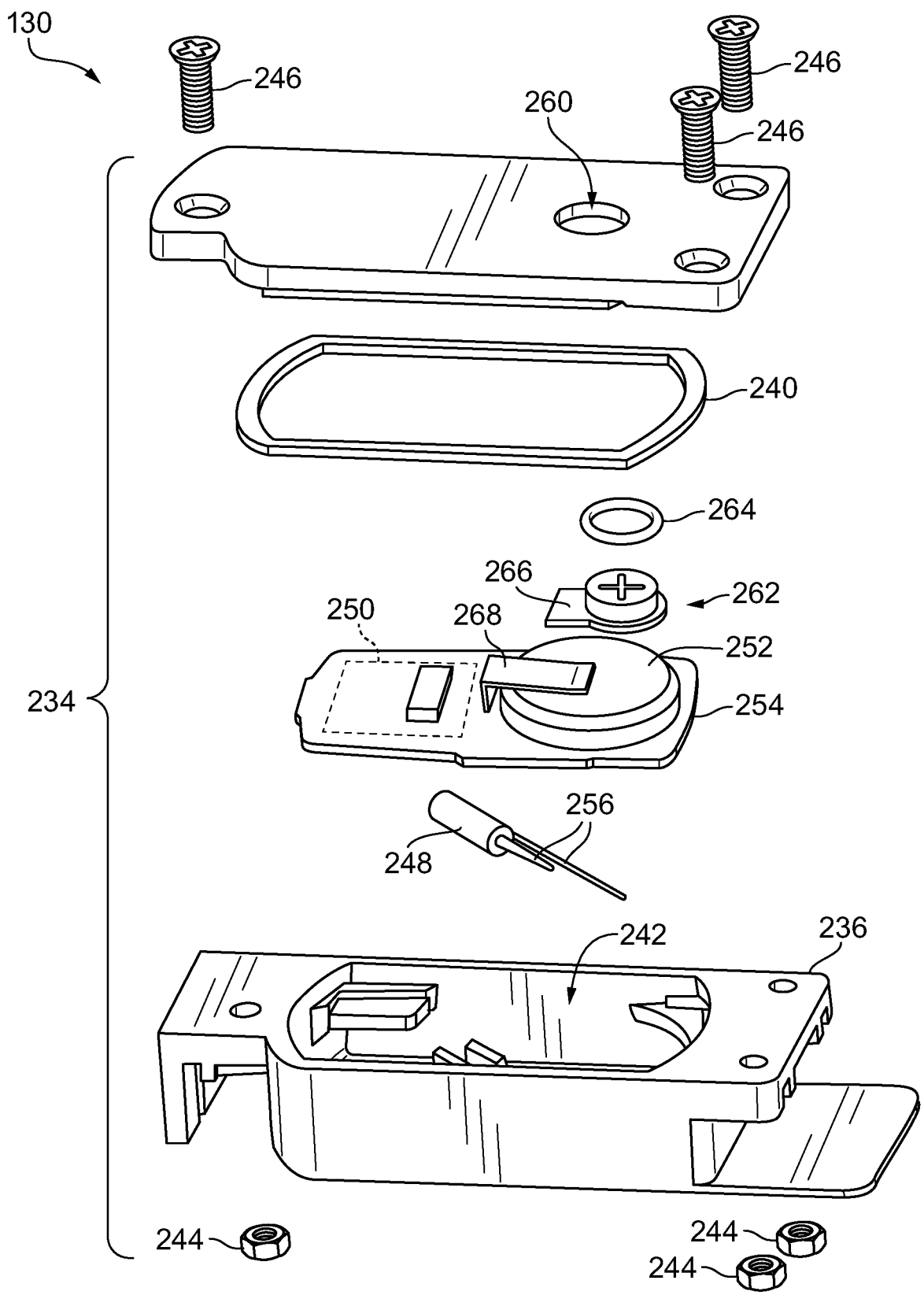
FIG. 2E is an exploded top isometric view of an alternate sensor.

An alternate arrangement for preventing battery drainage during shipping is shown in FIG. 2E, in which like reference numerals refer to like features of the sensor 130. In the alternate arrangement, the enclosure door 238 has an activation aperture 260 formed therethrough, into which is fitted an insulated circuit interrupter 262 and which is sealed by an o-ring 264. The circuit interrupter 262 includes an insulating tab 266 which is interposed between the battery 252 and the battery contact 268. The circuit interrupter 262 is adapted to receive the head of a screwdriver through the activation aperture 260 so that it can be rotated just prior to installation to move insulating tab 266 out of registration with the battery contact 268, enabling the battery contact 268 to electrically engage the battery 252.

The exemplary sensor 130 described above is merely one example of a sensor that is adapted to sense movement of the gate 108 from the lowered position toward the raised position but which stops short of reaching the raised position. While the use of a tilt switch carried by the gate as a trigger device for the sensor is considered an economical solution, other types of sensor may also be used. For example, movement of the gate 108 may be detected by a magnetic sensor, a photoelectric sensor, an optical sensor or a gyroscopic sensor.

Figure 3:
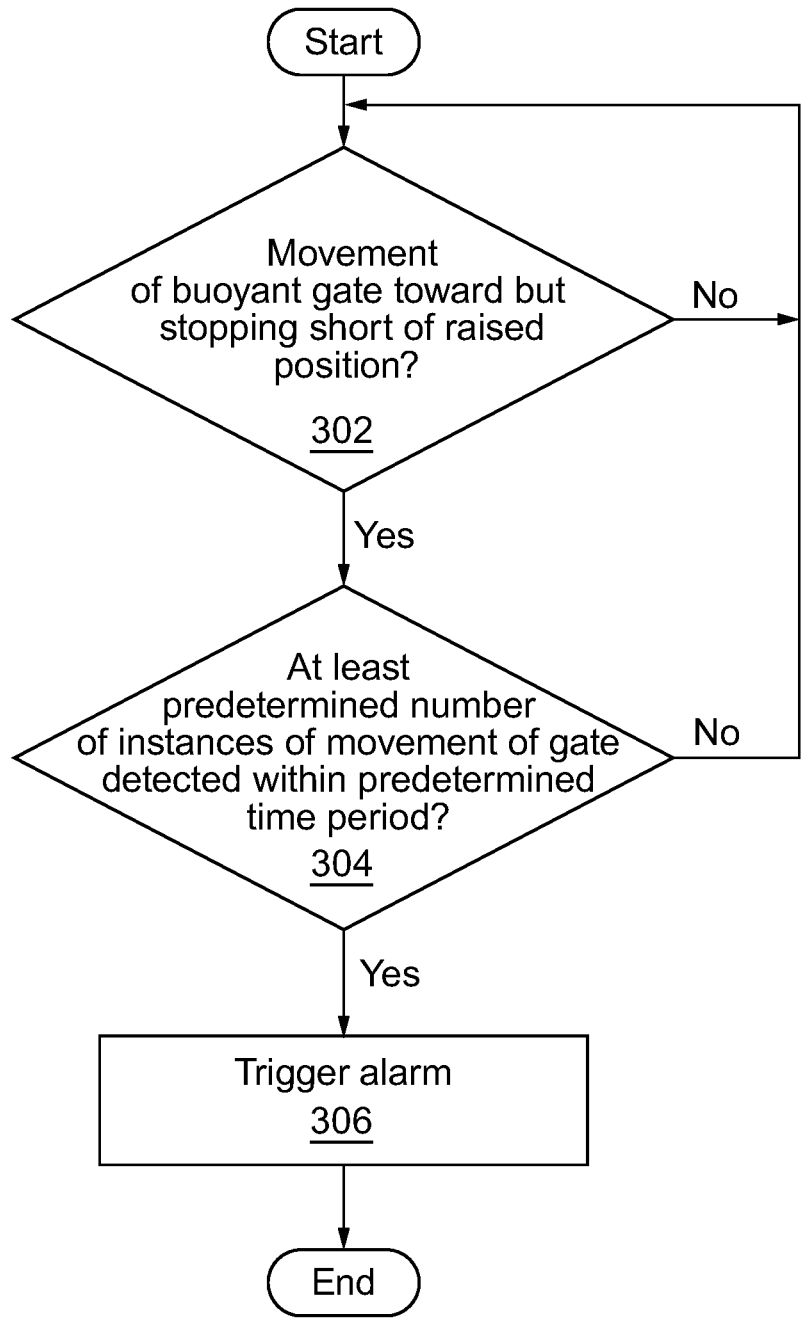
FIG. 3 is a flow chart showing an exemplary method for detecting an impending sewer backup by monitoring a buoyant gate in a normally-open backwater valve.

The exemplary backwater valve 100, including the sensor 130, enables a method for detecting an impending sewer backup, i.e. a partial obstruction. Reference is now made to FIG. 3, which is a flow chart showing an exemplary method 300 for detecting an impending sewer backup. At step 302, the method 300 monitors a buoyant gate in a normally-open backwater valve, such as the gate 108 in the backwater valve 100 described above, to detect instances of movement of the gate toward but stopping short of a raised position in which the gate closes the inlet to obstruct fluid flow through the valve. For example, the detector 132 may detect a signal from the wireless transmitter 250 when the tilt switch 248 closes as the gate 108 pivots toward the raised position. At step 304, responsive to detecting an instance of movement of the gate toward but stopping short of a raised position ("yes" at step 302), the method 300 checks whether at least a predetermined number of instances of movement of the gate within a predetermined time period have been detected. Responsive to detecting a predetermined number of instances of movement of the gate within a predetermined time period ("yes" at step 304), the method 300 proceeds to step 306 to trigger an alarm, and then ends. As noted above, the predetermined number of sensor activations is a plurality of sensor activations and not merely a single sensor activation.

The method 300 may test for a predetermined number of instances of movement of the gate within a predetermined time period by, for example, using a counter to track the actual number of instances of movement of the gate, which can be compared to the predetermined number of instances of movement of the gate, and using a timer to track the predetermined time period. In one exemplary implementation, the predetermined number of instances of movement of the gate is 10 and the predetermined time period is 30 days and more than 10 gate movements (above the required magnitude) within 30 days would trigger an alarm; these are merely exemplary values and other values may also be used. The predetermined time periods may be counted off as discrete intervals with the counter being reset after each interval. Alternatively, a "rolling" timer may be used to track the predetermined time period, with the counter being decremented when enough time has elapsed that the least recent instance of gate movement now falls outside of the predetermined time period. Where an Arduino board is used as a controller, program code for implementing the exemplary method 300 using a counter and timer approach may be adapted from the "push-button" example code posted on the Arduino IDE v1.6.9 at https://www.arduino.cc/en/Tutorial/Pushbutton and which is incorporated herein by reference; such adaptation is within the capability of one skilled in the art, now informed by the present disclosure.

If the method 300 does not detect a predetermined number of instances of movement of the gate within a predetermined time period ("no" at step 304), the method returns to step 302 to continue monitoring the gate. The exemplary method 300 may be modified to further monitor for the gate remaining in the raised position, for example by monitoring for a continuous signal from the wireless transmitter exceeding a predetermined duration.

Figure 4:
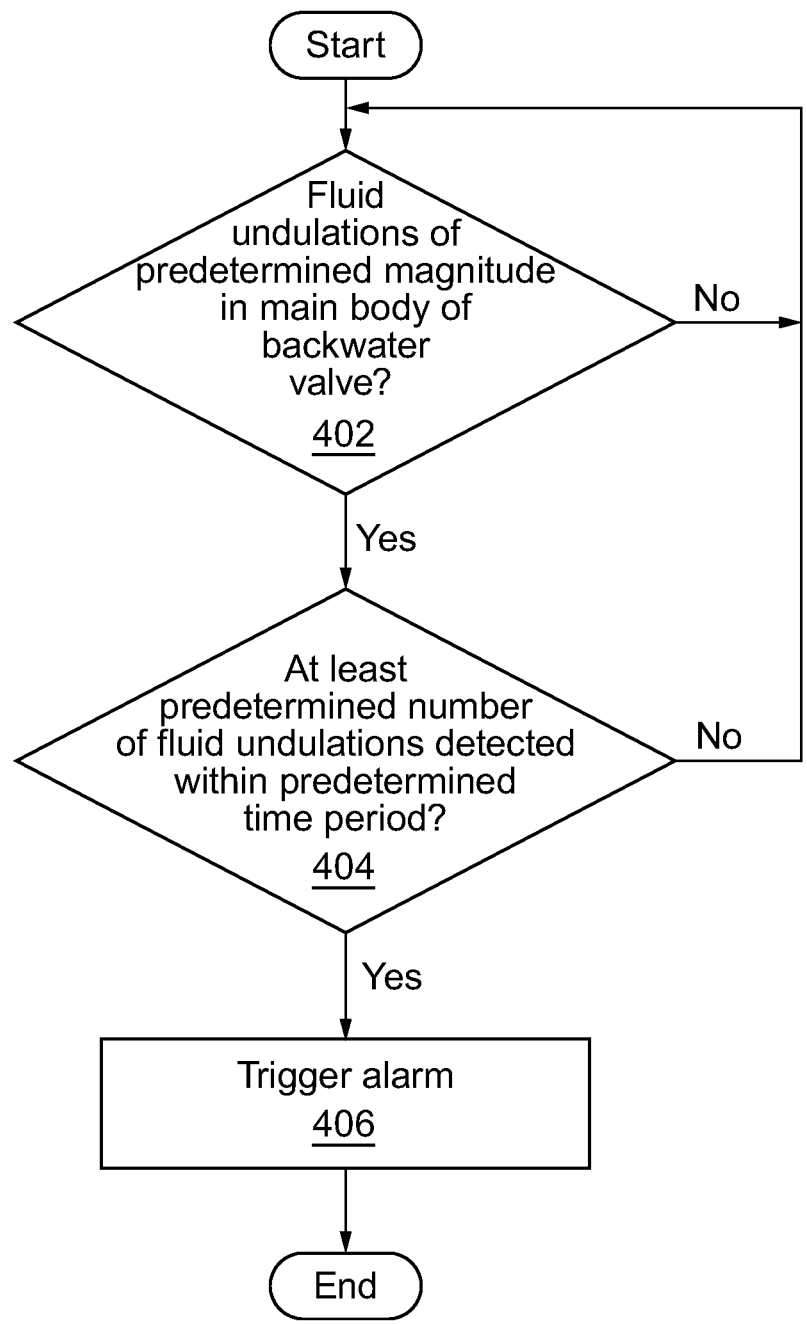
FIG. 4 is a flow chart showing an exemplary method for detecting an impending sewer backup by detecting fluid undulations of predetermined magnitude inside a main body of a backwater valve.

Reference is now made to FIG. 4, which illustrates in flow chart form a more general method 400 for detecting an impending sewer backup, i.e. a partial obstruction. The exemplary method 300 is merely one exemplary implementation of the method 400 shown in FIG. 4. At step 402, the method 400 detects fluid undulations of predetermined magnitude inside a main body of a backwater valve, for example by monitoring a buoyant gate of the backwater valve as in the exemplary method 300 in FIG. 3, or by using other sensors that detect when the liquid in the main body of the valve has reached a given level (one example of another such sensor will be described below in the context of FIG. 5). At step 404, responsive to detecting an undulation of predetermined magnitude inside the main body of the backwater valve ("yes" at step 402), the method 400 checks whether at least a predetermined number of fluid undulations of predetermined magnitude within a predetermined time period have been detected. Responsive to detecting a predetermined number of fluid undulations of predetermined magnitude within a predetermined time period ("yes" at step 404), the method 400 proceeds to step 406 to trigger an alarm, after which the method 400 ends. It will be appreciated that the predetermined number of fluid undulations is a plurality of fluid undulations and not merely a single fluid undulation.

Figure 5:
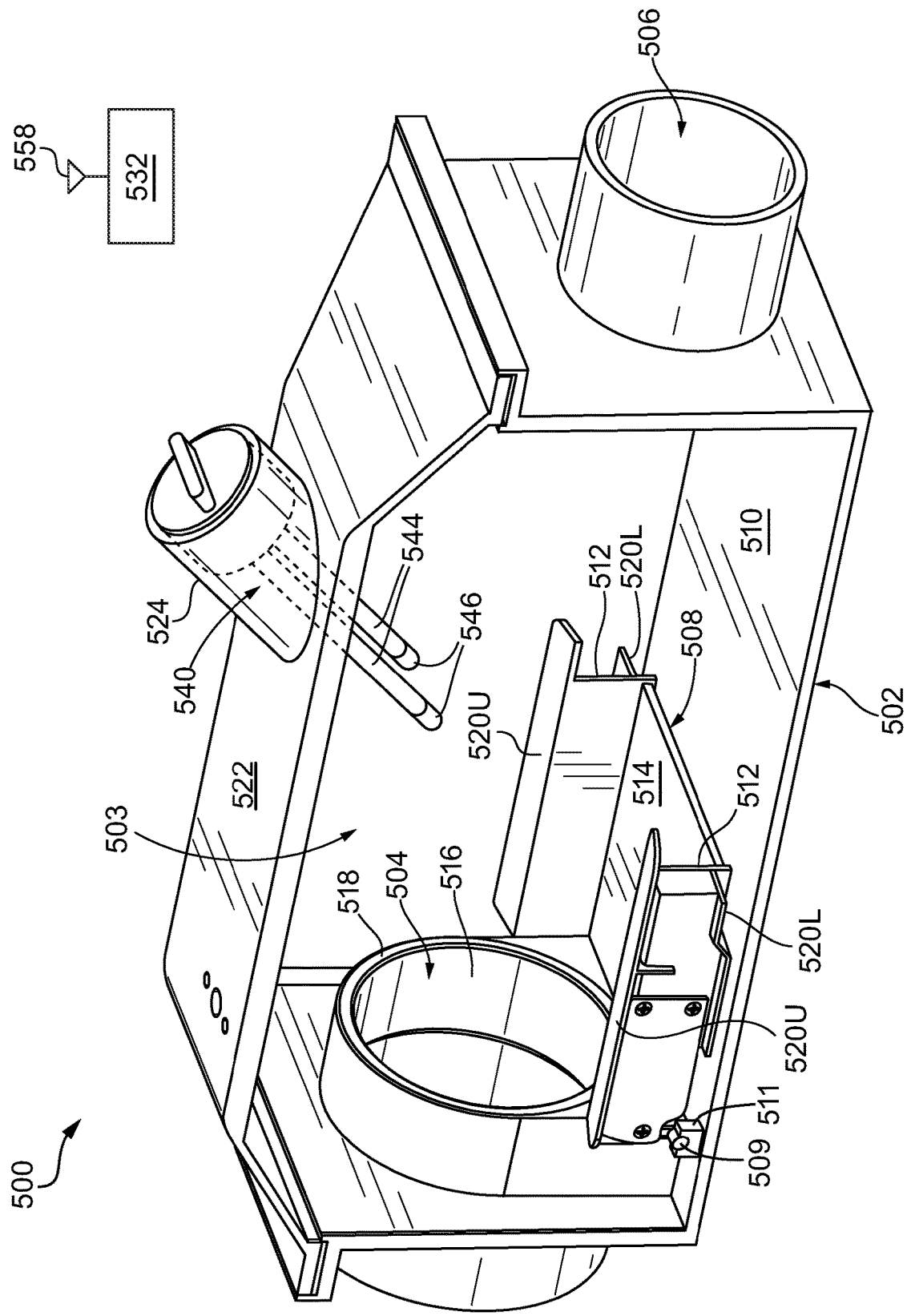
FIG. 5 is a top isometric cut-away view showing a second exemplary backwater valve according to an aspect of the present disclosure.

Reference is now made to FIG. 5, in which a second exemplary normally-open backwater valve is indicated generally by reference 500. Like the first exemplary backwater valve 100, the second exemplary backwater valve 500 may be used in implementing the method 400 described above.

The second exemplary backwater valve 500 is essentially identical to the first exemplary backwater valve 100, with like reference numerals denoting like features except with the prefix "5" instead of "1", except that the second exemplary backwater valve 500 does not include a sensor to sense movement of the gate 508 toward the raised position. Instead, second exemplary backwater valve 500 includes a sensor 540 adapted to sense when the liquid in the main body 502 of the backwater valve 500 has reached a given level and thereby sense fluid undulations of predetermined magnitude inside the main body 502 of the backwater valve 500. The sensor 540 is coupled to a detector 532 configured to trigger an alarm upon detecting a predetermined number (i.e. a plurality) of sensor activations within a predetermined period. The detector 532 may be similar or identical to the detector 132 described above.

In the exemplary embodiment shown in FIG. 5, the sensor 540 comprises a switch 542 which includes a pair of spaced-apart probes 544 depending into the interior volume 503. Conveniently, the probes 544 may extend from the inside of the removable closure member 526 received in the cleaning hatch 524 in the removable top 522 of the main body 502; this facilitates retrofitting of an installed backwater valves by simply replacing the existing closure member with a new closure member 526 incorporating the sensor 540, which can then communicate with the detector 532. Optionally, a protective coating may extend along the probes 544, but at least the tips 546 of the probes 544 are conductive, whereby the fluid undulations of predetermined magnitude inside the main body 502 of the backwater valve 500 will immerse the tips 546 of the probes 544 and thereby close the switch 542.

Figure 5A:
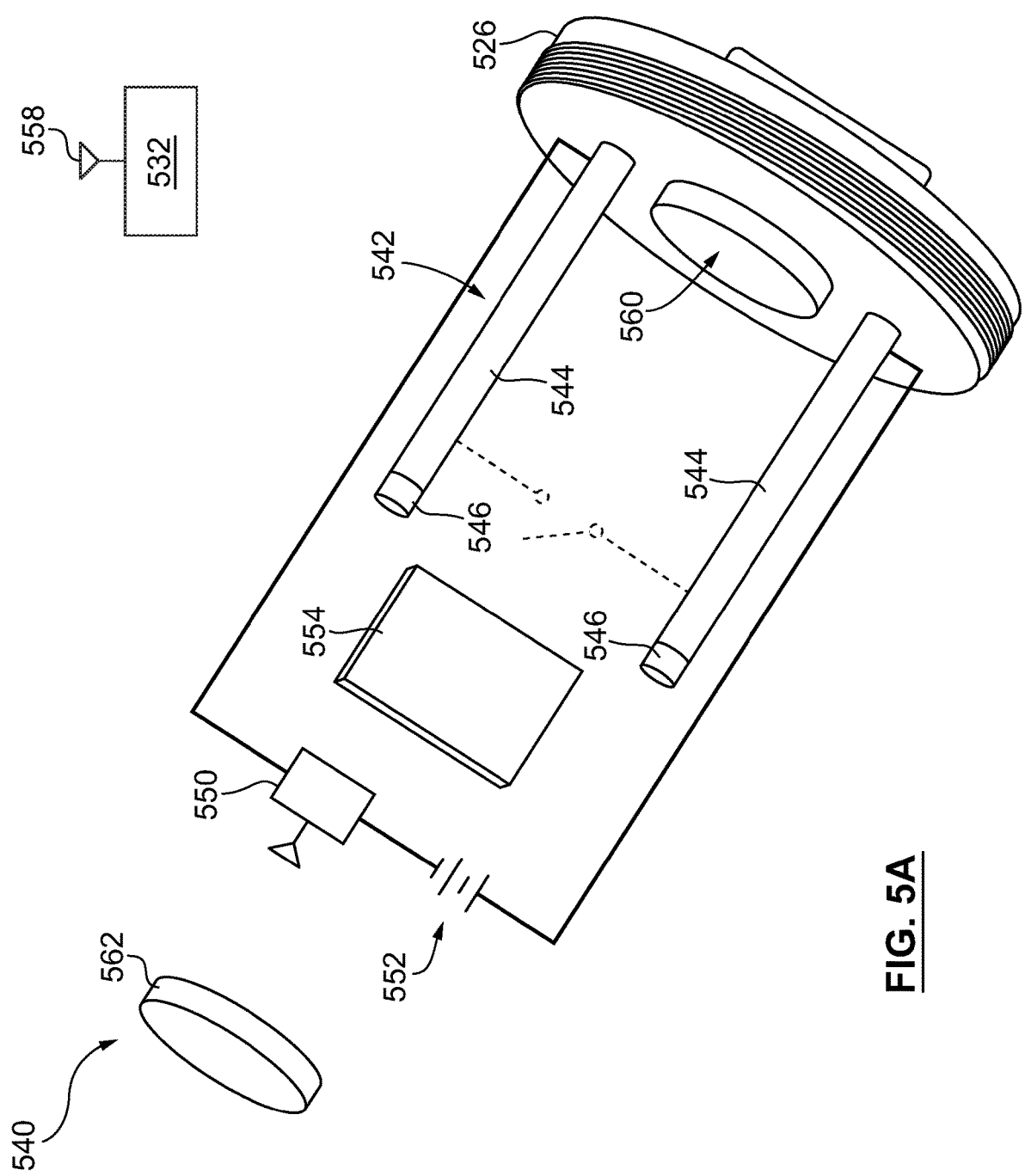
FIG. 5A is an exploded top isometric view of a sensor of the backwater valve of FIG. 5.

As best seen in FIG. 5A, in the illustrated embodiment, the sensor 540 comprises the switch 542, including the probes 544, a wireless transmitter shown schematically at 550 and a battery shown schematically at 552, all carried on a circuit board 554. The sensor 540 is coupled to the detector 532 by way of wireless communication from the wireless transmitter 550, and the detector 532 has a wireless receiver 558 (FIG. 5) adapted to receive signals from the wireless transmitter 550. This wireless configuration allows the detector 532 to be located physically remote from the backwater valve 500 without the need for wiring (although a wired connection is also contemplated).

The wireless transmitter 550, battery 552 and circuit board 554 are all carried in a waterproof compartment 560 on the inside of the removable closure member 526, with suitable sealing where probes 544 emerge; optionally the compartment 560 can be opened via removable and replaceable cover 562 to permit replacement of the battery 552. The switch 542 is electrically interposed between the wireless transmitter 550 and the battery 552 by way of leads, shown schematically at 556, so that, when the switch 542 is closed, the wireless transmitter 550 transmits a signal and when the switch 542 is open, the wireless transmitter 550 is silent. Thus, a relatively short signal from the wireless transmitter 550 will result when the switch 542 closes as water level rises within the interior volume 503 to submerge the tips 546 of the probes 544, and then opens as the water level falls below the tips 546 of the probes 544. As such, a relatively short signal from the wireless transmitter 550 represents an undulation of sewage in the backwater valve 500 and enables detection of that undulation by the detector 532. A complete obstruction would be represented by a continuous signal from the wireless transmitter 550 exceeding a predetermined duration, i.e. because the tips 546 of the probes 544 remain submerged.

Both the first exemplary backwater valve 100 and the second exemplary backwater valve 500 are merely exemplary embodiments of backwater valves that incorporate an alarm system comprising a sensor (e.g. sensors 130, 540) for sensing fluid undulations of predetermined magnitude inside a main body of the backwater valve, and a detector (e.g. detector 132, 532) operable to communicate with the sensor, with the detector configured to trigger an alarm upon detecting a predetermined number of sensor activations within a predetermined period. Other types of sensors for sensing fluid undulations may be incorporated into alternative embodiments of such an alarm system.

Although the above embodiments have described an arrangement in which the detector is physically remote from the backwater valve, it is also contemplated that the detector may be carried on the backwater valve (e.g. on the circuit board 254, 554). In such embodiments, the alarm may also be carried on the backwater valve, or may be remote therefrom and receive a signal (e.g. wireless or wired) from the detector on the backwater valve when the detector determines that the alarm should be activated.

The detector (e.g. detector 132, 532) may be implemented in software, hardware or a combination thereof. For example, the detector may comprise suitably programmed general purpose hardware (e.g., a programmed Arduino or similar board, or a programmed general purpose computer such as a desktop, laptop, tablet or smartphone), or may comprise specialized hardware. Thus, the present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more currently preferred embodiments have been described by way of example. It will be apparent to persons skilled in the art that a number of variations and modifications can be made without departing from the scope of the claims.

What is claimed is:

1. A backwater valve, comprising:
   a main body defining an interior volume;
   an inlet in fluid communication with the interior volume of the main body;
   an outlet in fluid communication with the interior volume of the main body;
   a gate disposed inside the main body;
   the gate being movably carried by the main body so as to be movable between:
   an open position in which fluid flow through the inlet into the interior volume of the main body is unobstructed by the gate; and
   a closed position in which the gate closes the inlet to obstruct fluid flow through the inlet;
   wherein when the gate is in the open position, fluid can flow from the inlet into and through the interior volume of the main body to and out of the outlet;
   the gate being buoyant in water whereby backflow through the outlet into the interior volume of the main body moves the gate toward the closed position;
   wherein the backwater valve includes a sensor for sensing movement of the gate toward but stopping short of the closed position.

2. The backwater valve of claim 1, wherein the sensor is coupled to a detector configured to trigger an alarm upon detecting a predetermined number of sensor activations within a predetermined period.

3. The backwater valve of claim 2, wherein the sensor comprises a tilt switch carried by the gate so that the tilt switch is open when the gate is in the lowered position and closes as the gate moves toward the raised position.

4. The backwater valve of claim 3, wherein the sensor further comprises:
a wireless transmitter; and
a battery;
and wherein the tilt switch is electrically interposed between the wireless transmitter and the battery so that, when the tilt switch is closed, the wireless transmitter transmits a signal and when the tilt switch is open, the wireless transmitter is silent.

5. The backwater valve of claim 4, wherein the sensor is coupled to the detector by way of wireless communication from the wireless transmitter.

6. The backwater valve of claim 4, wherein the tilt switch, the wireless transmitter and the battery are encased in a watertight enclosure.

7. The backwater valve of claim 4, wherein the detector is physically remote from the backwater valve.

8. A backwater valve, comprising:
a main body defining an interior volume;
an inlet in fluid communication with the interior volume of the main body;
an outlet in fluid communication with the interior volume of the main body;
a gate disposed inside the main body;
the gate being movably carried by the main body so as to be movable between:
an open position in which fluid flow through the inlet into the interior volume of the main body is unobstructed by the gate; and
a closed position in which the gate closes the inlet to obstruct fluid flow through the inlet;
wherein when the gate is in the open position, fluid can flow from the inlet into and through the interior volume of the main body to and out of the outlet;
the gate being buoyant in water whereby backflow through the outlet into the interior volume of the main body moves the gate toward the closed position;
wherein:
the backwater valve includes a sensor for sensing fluid undulations of predetermined magnitude inside the main body of the backwater valve; and
the sensor is coupled to a detector configured to trigger an alarm upon detecting a predetermined number of sensor activations within a predetermined period.

9. The backwater valve of claim 8, wherein the sensor comprises a switch.

10. The backwater valve of claim 9, wherein:
the switch comprises a pair of spaced-apart probes depending into the interior volume; and
at least tips of the probes are conductive, whereby the fluid undulations of predetermined magnitude inside the main body of the backwater valve immerse the tips of the probes and thereby close the switch.

11. The backwater valve of claim 9 or 10, wherein the sensor further comprises:
a wireless transmitter; and
a battery;
and wherein the switch is electrically interposed between the wireless transmitter and the battery so that, when the switch is closed, the wireless transmitter transmits a signal and when the switch is open, the wireless transmitter is silent.

12. The backwater valve of claim 11, wherein the sensor is coupled to the detector by way of wireless communication from the wireless transmitter.

13. The backwater valve of claim 11, wherein the detector is physically remote from the backwater valve.

14. An alarm system for a backwater valve, comprising:
a sensor for sensing fluid undulations of predetermined magnitude inside a main body of the backwater valve; and
a detector operable to communicate with the sensor,
wherein the detector is configured to trigger an alarm upon detecting a predetermined number of sensor activations within a predetermined period;
wherein the predetermined number of sensor activations is a plurality of sensor activations.

15. The alarm system of claim 14, wherein the sensor comprises a switch.

16. The alarm system of claim 15, wherein:
the switch comprises a pair of spaced-apart probes extending from an inside of a removable closure member receivable in a cleaning hatch in a removable top of the main body of the backwater valve; and
at least tips of the probes are conductive, whereby the fluid undulations of predetermined magnitude inside the main body of the backwater valve immerse the tips of the probes and thereby close the switch.

17. The alarm system of claim 15, wherein the sensor further comprises:
a wireless transmitter; and
a battery;
and wherein the switch is electrically interposed between the wireless transmitter and the battery so that, when the switch is closed, the wireless transmitter transmits a signal and when the switch is open, the wireless transmitter is silent.

18. The alarm system of claim 17, wherein the detector is operable to communicate with the sensor way of wireless communication from the wireless transmitter.

* * * * *